United States Patent
Sweeney et al.

(10) Patent No.: US 6,585,284 B2
(45) Date of Patent: Jul. 1, 2003

(54) CHILD STROLLER WITH HEIGHT-ADJUSTABLE REAR SEAT

(76) Inventors: Lisa A. Sweeney, 11925 - 53rd St. Ct. E., Edgewood, WA (US) 98372; Steven T. Sweeney, 11925 - 53rd St. Ct. E., Edgewood, WA (US) 98372

( * ) Notice: Subject to any disclaimer, the term of this patent is extended or adjusted under 35 U.S.C. 154(b) by 0 days.

(21) Appl. No.: 09/957,052

(22) Filed: Sep. 21, 2001

(65) Prior Publication Data

US 2002/0036391 A1 Mar. 28, 2002

Related U.S. Application Data

(60) Provisional application No. 60/234,644, filed on Sep. 22, 2000.

(51) Int. Cl.$^7$ .............................. B62B 1/00; B62D 39/00; A47C 1/02; A47C 1/08
(52) U.S. Cl. ............. 280/650; 280/33.993; 297/344.12; 297/256.17
(58) Field of Search ................................ 280/650, 642, 280/647, 648, 657, 658, 47.34, 47.36, 47.4, 47.38, 33.993, 87.043; 297/243, 256.13, 256.14, 256.15, 256.16, 256.17, 344.12, 256.11; D12/129

(56) References Cited

U.S. PATENT DOCUMENTS

| | | | |
|---|---|---|---|
| 244,014 A | * 7/1881 | Williams | ................ 297/344.12 |
| 4,728,112 A | 3/1988 | Wynens | |
| D321,850 S | * 11/1991 | Mong-Hsing | .............. D12/129 |
| 5,417,449 A | * 5/1995 | Shamie | ........................ 280/642 |
| D360,392 S | 7/1995 | Lewandowski | |
| 5,468,051 A | * 11/1995 | Huang | ................... 297/344.18 |
| 5,622,375 A | 4/1997 | Fairclough | |
| 5,653,460 A | * 8/1997 | Fogarty | ....................... 280/642 |
| 5,664,795 A | 9/1997 | Haung | |
| 5,829,826 A | * 11/1998 | Ziccardi | ...................... 297/118 |
| 5,848,797 A | * 12/1998 | Paez | ...................... 280/33.993 |
| 5,918,891 A | * 7/1999 | Russell | ................... 280/33.993 |
| 6,086,087 A | * 7/2000 | Yang | ........................... 280/658 |
| 6,099,022 A | 8/2000 | Pring | |
| D431,212 S | 9/2000 | Haung | |
| 6,267,406 B1 | * 7/2001 | Huang | ........................ 280/647 |
| 6,270,093 B1 | * 8/2001 | Johnson et al. | ......... 280/33.993 |
| 2002/0067026 A1 | * 6/2002 | Hsia | ........................... 280/647 |

FOREIGN PATENT DOCUMENTS

| | | | | |
|---|---|---|---|---|
| DE | 3150699 A1 | * | 6/1983 | ............. 297/344.12 |
| FR | 2 615 155 | * | 11/1988 | .................. 280/642 |
| WO | WO 94/28771 | * | 12/1994 | ............. 297/344.12 |

\* cited by examiner

*Primary Examiner*—Brian L. Johnson
*Assistant Examiner*—Gerald Klebe
(74) *Attorney, Agent, or Firm*—Polly L. Oliver

(57) ABSTRACT

A height-adjustable and collapsible seat for a child stroller. In the preferred embodiment, of the height-adjustable, collapsible seat is the second, or rear, seat of a tandem stroller, and is such that the child can sit in the seat either forward-facing or rearward-facing. Using the height-adjustable, collapsible rear seat, the pusher is able to adjust the seat height according to his/her preferences and needs (for instance, he/she can place the child at eye-level), or can even remove the seat entirely to provide for additional storage space or room for a second child to ride on the standing platform at the rear of the stroller, if such a platform is provided. In the preferred embodiment, the rear seat is also fitted out with the necessary attachments for an infant carrier, so that the stroller can accommodate any combination of child and infant, facing forward or rearward.

12 Claims, 3 Drawing Sheets

CHILD STROLLER WITH HEIGHT-ADJUSTABLE REAR SEAT

RELATED APPLICATION

This application claims priority under 35 U.S.C. §119(e) to U.S. provisional application Serial No. 60/234,644, filed Sep. 22, 2000.

FIELD OF THE INVENTION

This invention relates generally to strollers or baby carriages. More specifically, the present invention relates to a tandem child stroller with a height-adjustable rear seat that is both collapsible and removable.

BACKGROUND OF THE FIELD

Child strollers are used by mothers and fathers every day. In the last several years, many different types of child strollers have been appearing on the market to accommodate the many different types of families who need strollers. There are double (tandem) strollers, triple strollers, and side-by-side strollers. There are strollers adapted to support infant carriers, which can then be detached from the stroller and carried away.

U.S. Pat. No. 5,622,375 to Fairclough discloses a stroller with front seat and rear standing platform, which is designed ideally to be used by a younger (first) child sitting in the front seat and an older (second) child standing facing forward on the platform and holding onto the rear frame of the stroller. Fairclough's stroller, has only a rear bench seat, however, for the second child to sit in if desirable or even necessary.

U.S. Pat. No. 5,664,795 to Haung discloses a double stroller with a rear-facing seat for a second child. However, Haung's rear bench seat is usable only by older children who do not need the structural support that younger toddlers and infants need. Alternatively, Haung's U.S. Design Pat. No. Des. 431,212 discloses a design for a double stroller with a rear seat for a second child that is more adapted for an infant or toddler. However, the tandem stroller has the rear seat directly behind the front seat, thereby providing the forward-facing second child with no appreciable view.

U.S. Pat. No. Des. 360,392 to Lewandowski discloses a design for a tandem double stroller with elevated rear seat, so that the second child has a forward view. Although the second child has a view, there is no capability in Lewandowski's design for adjusting the height of the rear seat. Also, the seats in Lewandowski's stroller are fixed to the frame such that the seats are only forward facing.

U.S. Pat. No. 6,099,022 to Pring discloses a stroller with height-adjustable seat. However, Pring's stroller is only a single stroller. Additionally, although in U.S. Pat. No. 4,728,112, Wynens discloses a double stroller with an elevated rear seat which is rear-facing, Wynens' rear seat is not height-adjustable. There is no stroller currently in existence which has the versatility of a height-adjustable seat which can be forward-facing or rear-facing.

SUMMARY OF THE INVENTION

One aspect of the present invention comprises a child tandem stroller with a box-like wheeled frame supporting a fixed front seat and a height-adjustable rear seat. Whereas the frame, wheels, and front seat may be conventional elements, the innovative rear seat is novel in that not only is it height-adjustable, collapsible and removable, but also it provides the riding child with the choice of sitting forward-facing or rear-facing. In the preferred embodiment, the stroller also comprises a rear standing platform, so that the second child has the choice of riding while standing and gripping the frame (if the rear seat has been collapsed and removed).

In the preferred embodiment of the present invention, the height-adjustability of the rear seat is accomplished by making the back panel of the rear seat slidable along upwardly-extending frame members. Several detent holes in the upwardly-extending frame members pre-determine height settings. Once the pusher chooses a height setting, he/she locks the seat into position by fitting spring pins into the appropriate detent holes.

The rear seat completely collapses onto itself so that the stroller can be easily stored in a small space or so that the pusher can use the rear seat space for storage or other use. In the preferred embodiment, the rear seat is also completely removable by sliding it off the lower ends of the frame members. With the seat removed, the rear space is even more accessible. Being able to completely remove the rear seat greatly increases the versatility of the stroller, especially if the stroller is equipped with a rear standing platform (close to the rear wheels). In this case, the stroller can still accommodate two children: for instance, a younger child sitting in the front seat and an older child standing in the rear.

The present invention of the rear seat includes leg holes in both the front and the back panels. Further, both panels are otherwise stiff enough and high enough to provide structural back support to an infant or toddler. With these features, the second child can sit forward-facing or rear-facing in the rear seat. This option allows the pusher to position the child forward-facing so that the child can have a view, or rear-facing so that the pusher can observe the child's face. With the height-adjustability feature, the pusher can even position the child at or near eye level so that he/she can keep in close contact with the child.

The rear seat design of the preferred embodiment also comprises folding sidearms which, when locked into the extended position, provide arm rests for the child. To eliminate the possibility of a child getting pinched in the sidearm hinge, the hinges are covered with comfortable sleeves.

DETAILED DESCRIPTION OF THE PREFERRED EMBODIMENT

Figure 1:
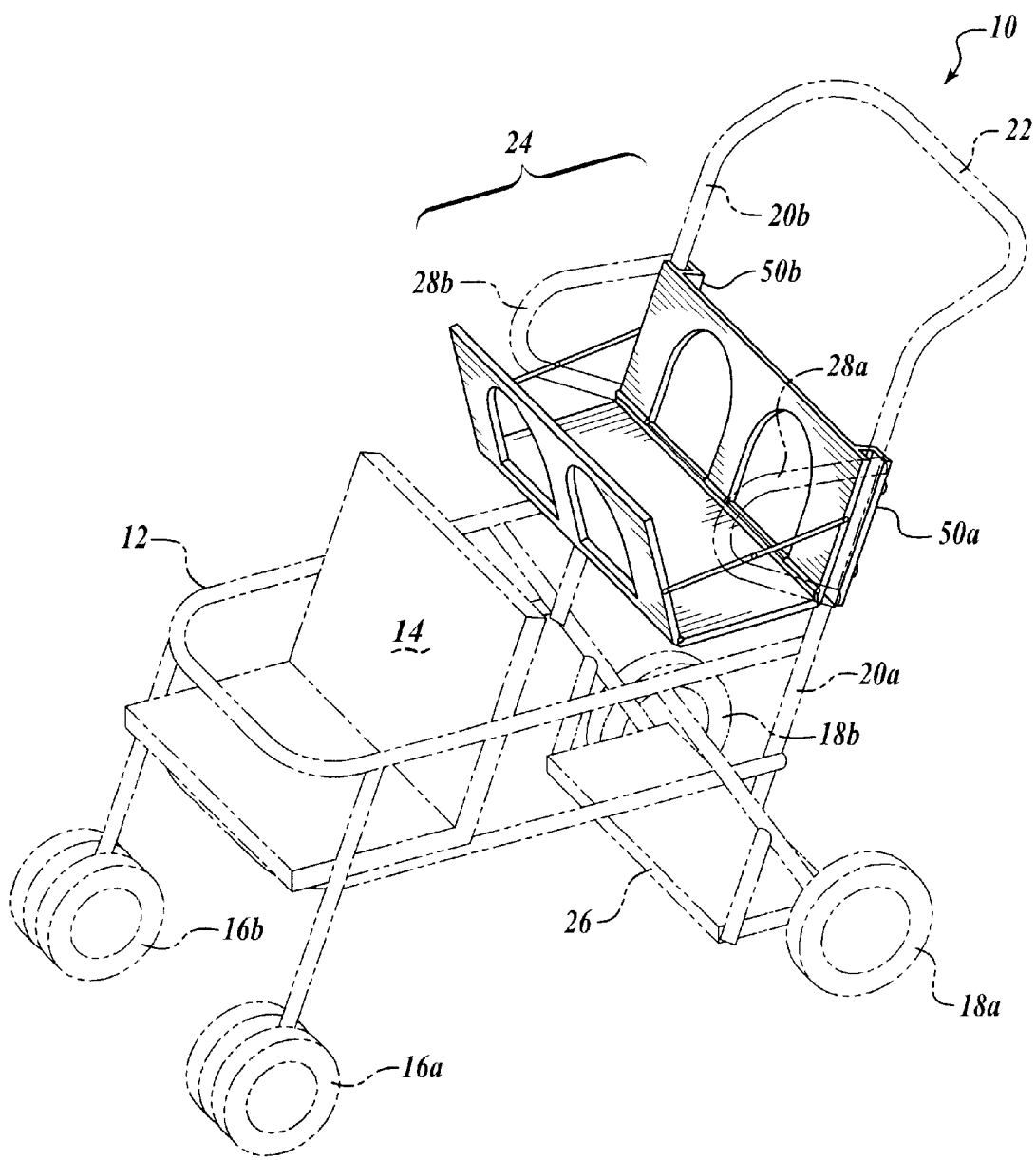
FIG. 1 is a perspective view of the preferred embodiment of the tandem child stroller with the height-adjustable rear seat.

FIG. 1 shows a tandem child stroller 10 with conventional frame 12 and forward-facing front seat 14. It has been chosen to use this type of tandem stroller for the preferred embodiment of the present invention although it is understood that the present invention could be embodied in a triple stroller, a side by side stroller, or even a single stroller with the invention of the height-adjustable seat being the only seat in the stroller. Furthermore there could be a standing platform 26, such as that described in U.S. Pat. No. 5,622, 375 to Fairclough, mounted on the frame of the stroller and used in conjunction with the present invention.

For clarity, the front seat 14 in the drawing of FIG. 1 has been simplified. However, it is understood that the front seat of the tandem stroller contemplated for the preferred embodiment is a standard front seat such as the ones shown in the Haung patents or the ones in current use on most tandem strollers on the market today.

The preferred embodiment includes two front wheels 16a and 16b and two rear wheels 18a and 18b arranged in a generally rectangular pattern below the frame. It is important for the present invention, whether or not the rear wheels 18a and 18b share a common axle, that the axis of rotation of the rear wheels 18 be located far enough rearward to stabilize the stroller when the rear seat 24 is in the highest position. In the design of the preferred embodiment of the present invention, the regulations of the Juveniles Products Manufacturers Association have been heeded, and the rear axis may be positioned far enough rearward on the frame so that the center of gravity of the child or children seated in the stroller will fall within the wheel base.

The frame 12 typically is constructed of tubular aluminum members having circular cross-sections. Other materials, such as plastics, could be used, and certainly the cross-section could be ovate or rectangular. Frame 12 includes two upwardly and rearwardly extending frame members, or rails, 20a and 20b (collectively 20), which in the preferred embodiment reach to a height of between approximately 2.5 and approximately 3 feet, a height about even with the waist of the average adult, and are connected to each other at their extreme upper ends by a lateral pushbar 22. If the frame members 20 are to support a second, height-adjustable seat 24 as in the present invention, the angle of the frame members 20 to the ground becomes rather important. For the preferred embodiment, an angle of approximately 70 degrees was chosen. This angle allows a large range of height adjustment choices for the rear seat 24 along the rails 20 without undue changes in the overall length of the stroller 10. A flatter angle may result in a greater number of adjustment settings; however, it would also necessitate a longer wheelbase of the stroller 10 so that the center of gravity of the children would fall within that wheelbase and the stroller 10 would maintain stability when loaded.

The preferred embodiment comprises a rear standing platform 26, which increases the versatility of the stroller 10. With the rear seat collapsed and removed, a child can stand on the standing platform 26 and grip the handles 28, thereby riding in a forward-facing mode.

FIG. 1 shows the rear seat 24 in the fully extended position. It is seen that a child can be placed in the seat 24 in a forward-facing or a rearward-facing position, depending only on the preferences of the child and the pusher. In the preferred embodiment, legholes are provided, which will be discussed in more detail later, in both front and rear panels; and at least the seat bottom, if not all the panels, is cushioned for the child's comfort. In the preferred embodiment, there is provided a removable cushioned back support panel which is of approximately the same size as the front and back panels and can be used to cover the unused legholes and provide a cushioned back rest for the child. In alternate embodiments, the rear seat 24 as well as the front seat 14 has attachments for infant carriers, so that any child-infant combination can be accommodated.

Figure 2A:
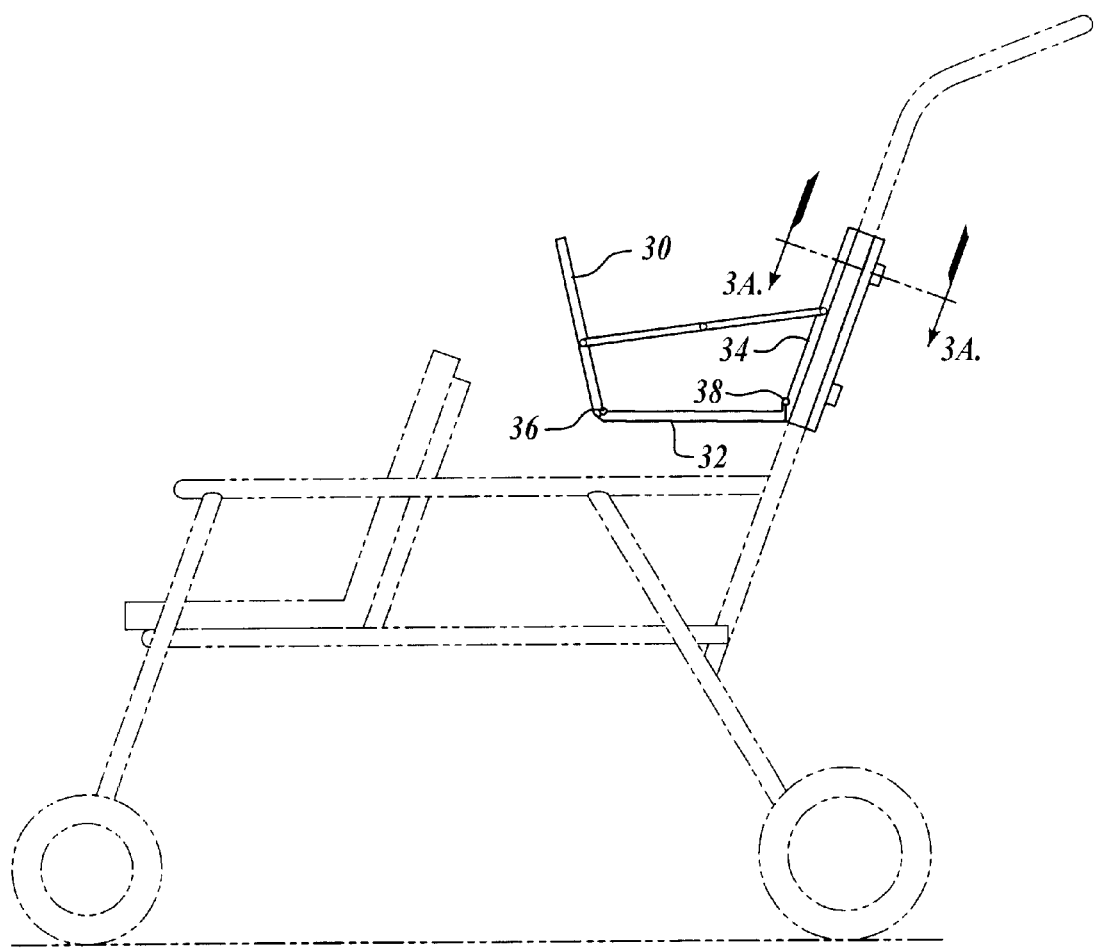
FIG. 2A is a side view of the stroller with the rear seat in the fully extended position.

The height-adjustable rear seat 24 in the preferred embodiment comprises three major panels, which are shown in the side view of FIG. 2A. (For clarity, the handles 28 are not shown.) Front panel 30 is attached to the seat bottom panel 32 with two double-leaf hinges 36. (Different types or numbers of hinges could be used, as long as they will perform the necessary function.) The hinges 36 allow that the front panel 30 can collapse completely against the bottom panel 32 in the direction of the arrow shown in FIG. 2B. Likewise the seat bottom panel 32 is attached to the rear panel 34 by a lateral hinge 38 which allows the seat bottom panel 32 to rotate in the direction shown by the arrow in FIG. 2C to collapse completely against the rear panel 34. (In alternate embodiments, of course, two or more hinges 38 could be used.) The hinge 38 is of the type, however, that prevents overrotation in the opposite direction, so that the seat bottom panel 32 can never extend further than a horizontal (with respect to the ground) position. A fully collapsed rear seat 24 may provide additional storage space behind the front seat 14.

Figure 2B:
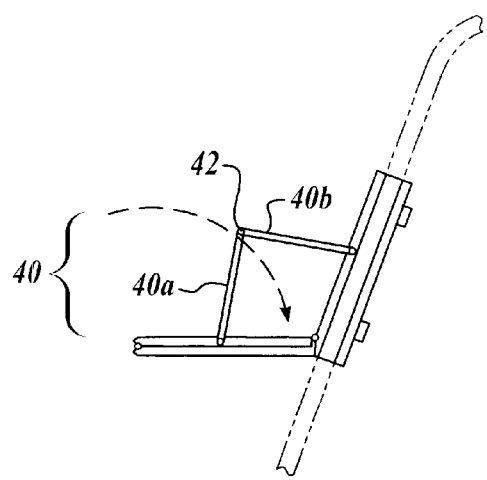
FIG. 2B is a detail view of the rear seat in an intermediate stage between the fully extended and fully collapsed positions.
Figure 2C:
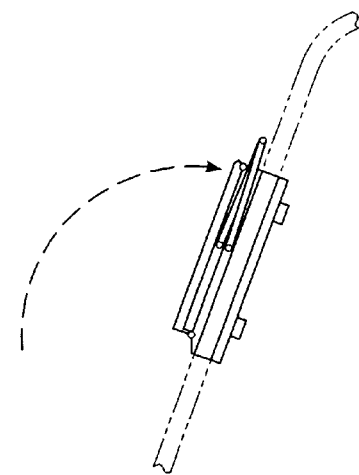
FIG. 2C is a detail view of the rear seat in the fully collapsed position.
Figure 2D:
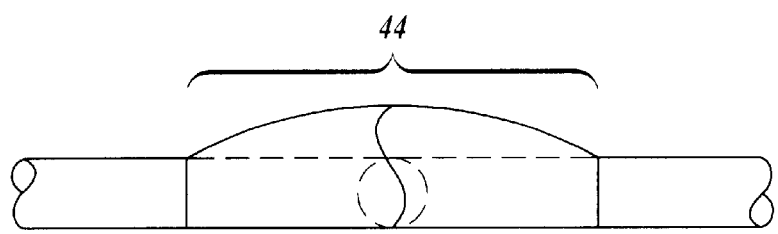
FIG. 2D is a detail view of the sleeve covering the sidearm in the locked position.

The two links 40a and 40b of the sidearm 40 are also shown in FIG. 2B. (For clarity, only one sidearm will be discussed; it is understood that the two sidearms, one on each side of the seat 24 are symmetrical.) The links 40 are connected by a swivel hinge 42, which allows the links 40 to collapse upon each other when the seat 24 is folded. When the seat 24 is fully extended, the links 40 will be aligned such that the hinge 42 can be locked into position using the sleeve 44 as shown in FIG. 2D. The sleeve 44 not only locks the sidearm 40 for safety, but also provides comfort for the child rider and prevents any potential pinching of the child's arms and fingers. A further benefit of the locking sidearms is that the front and back panels are locked into the extended position so that the child rider cannot push or pull the seat panels out of position.

Further, the front panel 30 and the rear panel 34 (best seen in FIG. 1) define legholes, so that the child can sit forward-facing or rearward-facing in the rear seat 24. The panel opposite the legholes used obviously becomes a backrest for the child, and so the height of the panel becomes important, in order to prevent the child from toppling over the panel. It has been discovered through experimentation based on the size of a normal child/toddler that the panels 30 and 34 should each be at least 7 inches high as measured from the seat bottom panel 32.

Figure 3A:
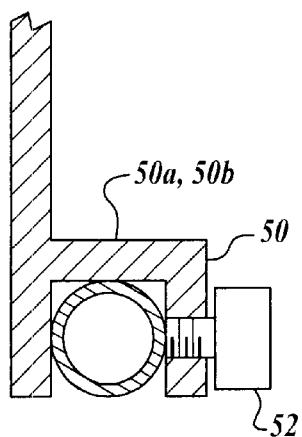
FIG. 3A is a section view showing the preferred method of height adjustability of the rear seat.
Figure 3B:
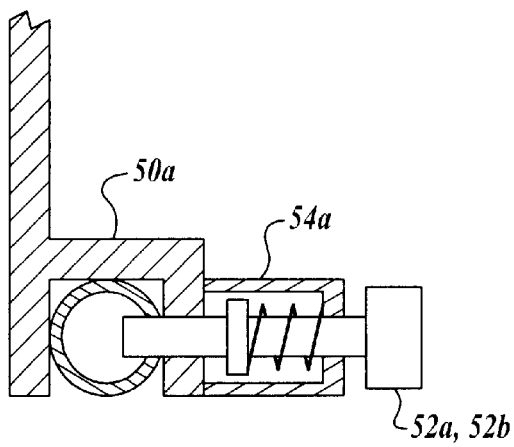
FIG. 3B is a section view showing an alternate method of height-adjustability of the rear seat.

In the preferred embodiment, the rear panel 34 of the rear seat 24 slides up and down along the rails 20, thereby providing height-adjustability of the rear seat 24. The pusher can therefore choose the desired configuration based on the size of the child and the pusher's preferences. FIG. 3A shows the preferred arrangement of channels 50a and 50b, which are mounted on the backside of rear panel 34, riding on the rails 20a and 20b respectively. (For clarity, only one channel of the seat 24 is shown; it is understood that the two channels, one on each side of the seat 24 are symmetrical.) The pusher can choose any point along the rails 20, and then simply tighten the hand screws 52, which extend through the channels 50, against the rails 20. Alternatively, as is shown in FIG. 3B, the pusher adjusts the height of the rear seat 24 by choosing a set of detent holes (not shown) along the rails 20 and releasing the spring pins 52a and 52b into those holes. These alternate embodiments include means by which the pusher can easily actuate, i.e., disengage and engage, the spring pins 52. For instance, bias box 54a can be attached to channel 50a to provide the spring bias. A trigger or button mechanism can easily be mechanically linked to the spring pin 52, depression of which would cause the spring pin 52 to disengage so that the rear seat 24 could be slid along the rails 20. In another alternate embodiment, the adjustment is not made by pins at all but sheathed cables which run up and down within the rails 20 and are attached to the rear seat 24.

While the present invention has been described in connection with what is considered the most practical and preferred embodiment, it is understood that this invention is not limited to the disclosed embodiment, but is intended to cover various arrangements included within the spirit and scope of the broadest interpretation, so as to encompass all such modifications and equivalent arrangements.

While the invention has been described with a certain degree of particularity, it is manifest that many changes may be made in the details of construction and the arrangement of components without departing from the spirit and scope of this disclosure. It is understood that the invention is not limited to the exemplified embodiment set forth herein.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to.

What is claimed is:

1. A child stroller comprising:
   a generally box-like frame, defining a front end and a rear end, formed of generally tubular members linked together to provide a support structure for at least two child seats and a wheelbase for the attachment of at least three wheels, the frame including two laterally spaced generally tubular members extending upwardly and rearwardly at an angle with respect to the wheelbase;
   at least three wheels attached to the wheelbase of the frame, two of said wheels being attached at the rear of the wheelbase on either side of the wheelbase and defining a common axis of rotation, such axis being generally orthogonal to the upwardly extending angled frame members;
   a front seat, having a seat bottom, mounted on the frame towards the front end and designed to accommodate a child, such that the seat bottom of the front seat is defined within a reference plane which is generally parallel with the plane defined by the wheelbase
   a rear seat slidably mounted on the two upwardly extending angled frame members and designed to accommodate a child, such rear seat defining a generally flat seat bottom panel, the plane defined by the bottom panel being generally parallel to the reference plane, wherein the rear seat comprises a generally rectangular rear panel slidably mounted on the two upwardly extending angled frame members, a generally flat generally rectangular bottom panel hingably attached on one edge to the rear panel, and a generally flat generally rectangular front panel hingably attached on one edge to the bottom panel, said rear and front panels defining U-shaped leg holes, such U-shaped leg holes having open ends oriented towards the bottom panel; and
   means for sliding the rear seat along the length of the two upwardly extending angled frame members, wherein said sliding means includes locking means for locking the rear seat in a range of positions between an uppermost position and a lowermost position, and the axis of rotation of the rear wheels is located as far rearward on the wheelbase of the stroller as necessary so as to coincide with the uppermost position of the rear seat.

2. The child stroller of claim/further comprising
   two sidearms attached between the edges of the front panel and the edges of the rear panel of the rear seat, one on each side of the rear seat.

3. The child stroller of claim 1 wherein
   the sliding means comprise channels fixedly attached to rear panel of the rear seat that ride upon the rails formed by the upwardly-extending angled frame members and the locking means comprise hand screws that extend through the channels such that the screws can be tightened against the rails, thereby providing infinite slidable and lockable adjustment of the rear seat along the angled frame members.

4. The child stroller of claim 3, wherein
   the upwardly extending angled frame members define detent holes at prescribed locations along the length of the angled frame members, such holes being designed to accept spring pins and such holes being indexed so as to allow level adjustment of the rear seat along the length of the angled frame members;
   the locking means comprises spring pins that extend through the channels such that the pins can be fitted into the detent holes, said locking means further comprising means for engaging and disengaging the spring pins into and out of the detent holes thereby effecting slidable and lockable adjustment of the rear seat along the angled frame members.

5. The child stroller of claim 4 further comprising
   a rear hinge disposed between the rear panel and the bottom panel of the rear seat so that the bottom panel alternately can be collapsed -against the rear panel of the rear seat and rotate open toward the front of the stroller; and
   a front hinge disposed between the front panel and the bottom panel of the rear seat so that the front panel alternately can be collapsed against the bottom panel of the rear seat and can be rotated open upwards from the bottom panel.

6. The child stroller of claim 2 wherein
   each sidearm comprises two links, between which two links is disposed a swivel hinge allowing the sidearm to collapse upon itself as the rear seat panels are collapsed.

7. The child stroller of claim 6 further comprising: a sleeve covering at least part of each sidearm link, such that when the links are locked into the extended position, the sleeves will meet to form a continuous cover over the hinge of that sidearm.

8. The child stroller of claim 1 wherein
   the rear seat is slidably and removably mounted on the two upwardly extending angled frame members, such rear seat defining a rear panel defining leg holes and further defining channels which are slidably mounted to the upwardly extending angled frame members, a seat bottom hinged to and collapsible onto the rear panel, and a front panel hinged to and collapsible onto the seat bottom, and two side arms, each sidearm comprising two links, between which two links is disposed a swivel hinge allowing the sidearm to collapse upon itself.

9. A height-adjustable, collapsible seat for a child stroller with a wheelbase generally parallel with the ground, comprising:

two laterally spaced generally tubular frame members extending generally upwardly at an angle with respect to the wheelbase of the stroller;

a rear seat slidably mounted on the two upwardly-extending angled frame members and designed to accommodate a child, such rear seat comprising a seat bottom panel, a front panel hingably attached to the seat bottom panel, a rear panel hingably attached to the seat bottom panel, and two side arms attached between the front and rear panels, both the front panel and the rear panel further defining two leg holes.

10. The collapsible seat of claim 9 wherein the sliding means comprises channels fixedly attached to the rear panel of the rear seat that ride upon the rails formed by the upwardly-extending angled frame members;

the upwardly extending angled frame members define detent holes at prescribed locations along the length of the angled frame members, such holes being designed to accept spring pins and such holes being indexed so as to allow level adjustment of the rear seat along the length of the angled frame members;

the locking means comprises spring pins that extend through the channels such that the pins can be fitted into the detent holes, said locking means further comprising means for engaging and disengaging the spring pins into and out of the detent holes thereby effecting slidable and lockable adjustment of the rear seat along the angled frame members; and the means for engaging and disengaging the spring pins comprises a finger trigger linked to the spring pins such that depression of the trigger releases the pin for slidable movement of the rear seat and releasing the trigger engages the spring pin into the chosen detent hole so as to lock the rear seat into position.

11. A method for transporting two young children in a tandem child stroller, such stroller comprising a frame with rails, at least three wheels attached therebeneath, a front seat mounted on the frame, a height-adjustable, collapsible, removable rear seat mounted on the frame rails with means for sliding and locking the rear seat into position, and a standing platform mounted to the frame near the wheelbase, comprising the steps of:

extending the rear seat from a collapsed position into a fully extended position;

adjusting the height of the rear seat by sliding the rear seat along the frame rails and locking the rear seat into the desired position;

placing a first child into the front seat in a forward-facing position and placing a second child into the rear seat in a backward-facing position with the child's legs extending through leg holes in the rear panel of the rear seat.

12. The method of claim 11 wherein the rear seat is removed and the second child stands on the standing platform.

* * * * *